UNITED STATES PATENT OFFICE.

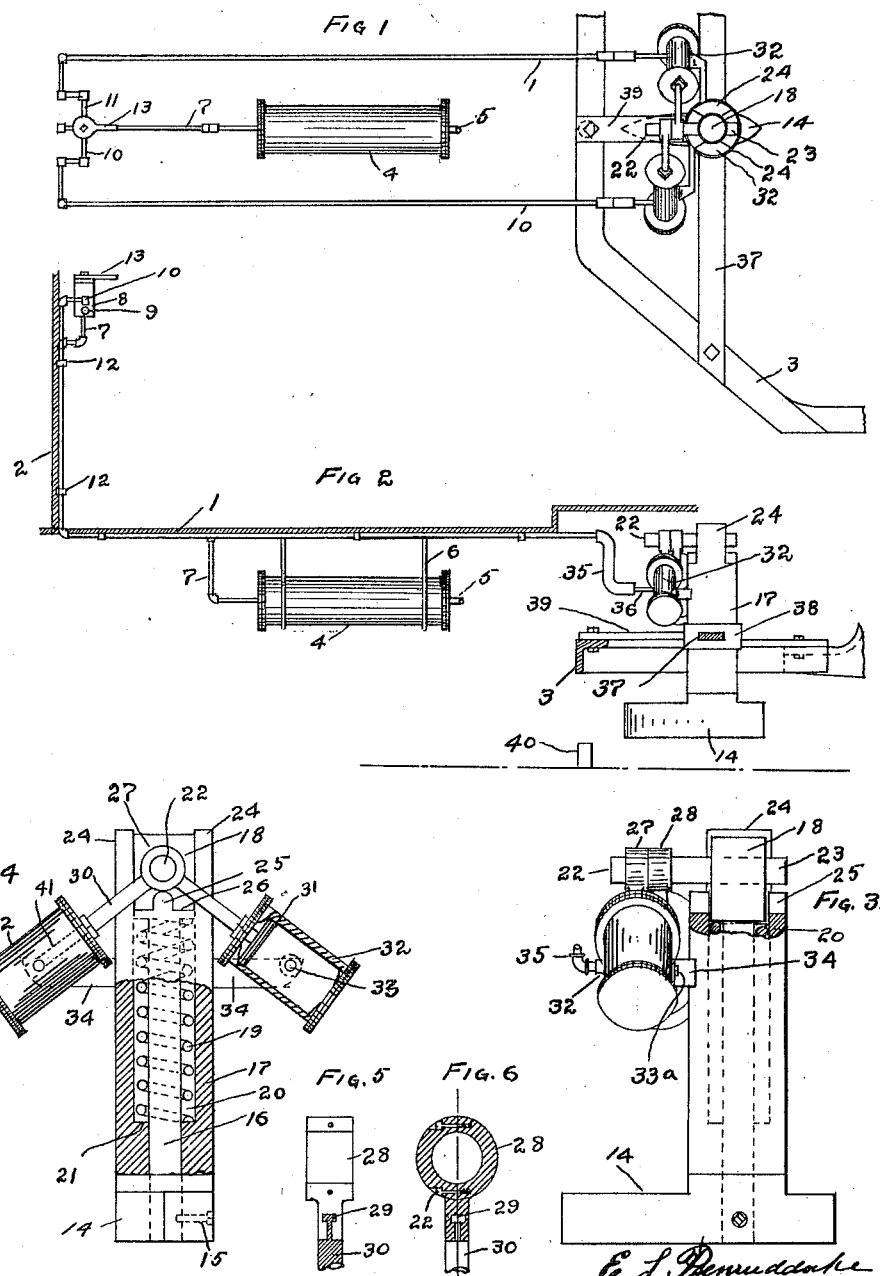

EDMUND L. PENRUDDOCKE, OF BIRMINGHAM, ALABAMA, ASSIGNOR TO AMERICAN AUTOMATIC RAILWAY SWITCH COMPANY, OF BIRMINGHAM, ALABAMA, A CORPORATION OF ALABAMA.

POINT-THROWER.

998,632.        Specification of Letters Patent.      Patented July 25, 1911.

Application filed April 3, 1911. Serial No. 618,562.

*To all whom it may concern:*

Be it known that I, EDMUND L. PENRUDDOCKE, a citizen of the United States, residing at Birmingham, in the county of Jefferson and State of Alabama, have invented certain new and useful Improvements in Point-Throwers, of which the following is a specification.

My invention relates to improvements in point throwing mechanism for railway track switches which is mounted on the street car or locomotive and adapted to be adjusted by the motorman or engineer in accordance with the direction in which it is desired to throw the switch.

The object of my invention is to improve the mechanism for adjusting and lowering the point thrower and adapt same to be operated by air pressure.

My invention is of particular advantage where it is desired to mount the point thrower on the car truck, as the air connections may be made flexible to provide for the relative movements that take place between the truck and car platform where the motorman stands.

By adapting my air pressure operated mechanism to both lower and laterally adjust a depressible and rotatable point thrower, I avoid the necessity of any mechanical connections between the platform and truck which is a valuable point, particularly where there is considerable mechanism under the platform, as is the case with many cars equipped with air brakes.

My invention comprises the details of construction and arrangement of parts hereinafter more particularly described and claimed, reference being had to the accompanying drawings, in which:—

Figure 1 is a plan view of the car truck broken away with my improved air operating equipment for the point thrower. Fig. 2 is a vertical sectional elevation through the car platform and truck showing my invention in side elevation. Fig. 3 is a similar view of my mechanism enlarged. Fig. 4 is a front view partly broken away of Fig. 3. Figs. 5 and 6 are detail views of the swiveled connection between the pistons of the motors and the rotatable and depressible point thrower.

Similar reference numerals refer to similar parts throughout the drawings.

I have shown my invention applied to a street car of any standard type, having a platform 1, a front board 2, and a truck frame 3. An air reservoir 4, connected by a pipe 5 with the air pump, is suitably supported from the platform by clips 6. This reservoir is connected by a pipe 7 with a valve cylinder 8 which has an exhaust port 9 and two ports which connect respectively with the pipes 10 and 11. The pipes 7, 9 and 10 are suitably connected to the front board by clips, such as 12, and have suitable elbows and connections all of standard construction. Within the valve chamber 8 is an ordinary three-way valve controlled by a handle 13, which valve, in neutral position shown in Fig. 1, shuts off pressure from the pipes 10 and 11 and leaves them open to the exhaust. When moved to the right or the left the valve admits air pressure to the pipe 10 or 11 and holds the pressure therein until turned back to neutral position when it exhausts the air pressure from the pipe. The car carries a depressible and rotatable point thrower comprising a pointed foot-piece 14 which is connected by a screw 15, having its head countersunk in the side of the foot-piece, to a round stem 16 which extends upwardly through the casing 17 and is provided at its top with an integral forged head 18, circular in horizontal cross section and having a larger diameter than the stem 16 so as to provide a shoulder at the top of the stem against which the upper end of a coil spring 19 bears, the spring being wound about the stem 16 and disposed within a chamber 20 in the casing 17. The lower end of the spring rests on the bottom 21 of the chamber 20 which has a central opening which forms a bearing for the lower end of the stem 16. The spring 19 normally holds the foot-piece elevated, as shown in Fig. 2.

A pin is passed through the opening in the head 18 and fixed therein so that its front and rear ends 22 and 23 project sufficiently beyond the head to engage the side edges of opposite vertical extensions 24 of the casing 17. These extensions have vertical parallel side edges which form between them an opposed pair of slots of equal width and spaced midway in the bottom of each slot is a stud or projection 25, the top of which is rounded and which is raised comparatively a small distance from the bottom wall 26. The forward end 22 of the pin extends beyond the casing and has connected thereto a pair of swivel heads 27 and 28. Each head is formed in two parts which are bolted together by the pins 22 and are correspondingly recessed to form when assembled a socket to receive a swivel head 29 formed integral with a stem 30 of a piston 31. The two stems 30 are disposed obliquely and at right angles to each other and their respective pistons 31 work in a pair of pivoted cylinders 32, these cylinders having trunnions 33 near their centers which are journaled in brackets 34 rigidly attached to the casing 17. Air pressure is delivered from the pipes 10 and 11 by flexible hose sections 35 which enter the forward sides of the cylinders opposite the trunnions. A nut 33ª or equivalent device may be used to engage the trunnion 33 and hold it in its bearing in the bracket 34.

The casing 17 is supported from the truck by a cross brace 37 extending across the truck and bolted to or formed integral with a sleeve 38 which surrounds the casing 17 near the center thereof. To take the thrust strain and further brace the support for the point thrower, I provide a front brace 39 which is bolted to the front end of the truck and to said sleeve 38. This gives a strong rigid support braced against both lateral and thrust strain.

In operation, when it is desired to lower and turn the foot-piece 14 so as to throw in a desired direction the pin 40, which forms part of the switch throwing mechanism, the motorman turns the valve stem 23 to the right or the left according to the direction in which he wishes to throw the pin 40 and move the switch point. If he should desire to throw the point to the right as the car moves in Fig. 1, the stem 13 is turned to the left and air admitted through pipe 10 to the left hand cylinder 32. The air flows through a passage 41 to the upper end of the cylinder and acts to force the piston 31 down so that it exerts a direct pull on its stem in a diagonal direction, causing the pin 22 to swing downwardly in an oblique direction until it strikes against the side edge of the left hand extension 24. When the piston continues to move its full stroke the pin is forced down into the space between the left hand extension 24 and the front stud 25, the rear portion 23 of the pin being at the same time wedged between the right hand extension 24 and the rear stud 25. This, it will be seen, gives both a lowering and a turning movement in the point thrower, causing the latter to be rigidly set in lowered position with its foot-piece turned to the left so that it will engage the pin 40 and force it over to the right, moving the switch point in the desired direction. As the pin 22 is swung and lowered, the cylinders 32 rock on their trunnions and the heads 27 and 28 turn on the swiveled heads 29 so as to avoid any binding action, there being enough lost-motion in the connection of the heads to the pin to permit a free operation. As soon as the switch has been thrown, the valve is turned to neutral position when the air pressure is exhausted from the left hand cylinder 32 and the spring 19 acts to force the head 18 upward and cause it to assume the position shown in Fig. 4, when the pin stands above the studs 25. The hose connections 35 permit free lateral play for the truck and also take up the small movement of the cylinders as they rock on their trunnions.

Having thus described my invention, what I claim, is:—

1. The combination with a depressible and rotatable point thrower, of fluid pressure mechanism to depress and rotate said point thrower, substantially as described.

2. The combination with a depressible and rotatable point thrower, of fluid pressure mechanism to depress and rotate said point thrower, and valve means, operable from the car platform, for controlling said fluid pressure mechanism, substantially as described.

3. The combination with a car and its truck, of a depressible and rotatable point thrower mounted on said truck, fluid pressure mechanism for lowering and turning the point thrower which is also mounted on the truck, pipe means for conducting fluid pressure to said operating mechanism which pipe means is adapted to flex to provide for relative movement between truck and car, and valve means to control the admission of fluid pressure to said pipe means and fluid pressure mechanism, substantially as described.

4. In an apparatus of the character described, a point thrower adapted to be depressed and turned, and a fluid pressure motor having an obliquely disposed piston rod connected to said point thrower, substantially as described.

5. In an apparatus of the character described, a point thrower adapted to be depressed and turned, and a pair of fluid pressure motors having obliquely disposed piston rods disposed at an angle to each and operably connected to said point thrower, substantially as described.

6. In an apparatus of the character described, the combination of a point thrower adapted to be lowered and turned and having spring means to hold the same normally elevated, means to lower and turn said point thrower comprising a pair of fluid pressure motors, and means operable by said motor to exert a force on said point thrower in a direction inclined with respect to the axis thereof, substantially as described.

7. A point throwing mechanism for railways, comprising a vertically movable and rotatable member carrying a point throwing foot-piece, and a fluid pressure motor having operating connections with said member for exerting a force thereon in a direction obliquely to the axis of the member to positively depress it and simultaneously turn said foot-piece at a proper angle to throw the switch, substantially as described.

8. A point throwing mechanism comprising a depressible and rotatable point throwing member, and means to exert a force on said member in a direction to simultaneously depress and rotate it, said means comprising a pivoted cylinder having an obliquely movable piston connected to said member, substantially as described.

9. A point throwing mechanism comprising a depressible and rotatable point throwing member, and fluid pressure operated means to exert a force on said member in a direction to simultaneously depress and rotate it, said means having an operating member swivelly connected to said member, substantially as described.

10. A point throwing mechanism comprising a depressible and rotatable point throwing member, and means to exert a force on said member in a direction to simultaneously depress and rotate it, and means comprising a pair of fluid pressure motors having pistons disposed obliquely and at angles to each other and connected to said member to provide for lost-motion, substantially as described.

11. A point throwing mechanism for railways, comprising a depressible and rotatable point thrower having a stem, a pin connected at the upper end thereof, a guide for the stem, spring means to engage the stem and hold the same elevated, notches formed in said guide which receives the pin when in each of its lowered positions and lock it therein against rotation, in combination with means to exert a force on said pin to simultaneously depress and rotate said point thrower, said means comprising a pair of fluid motors having pistons connected to said pin, and valve means disposed on the car platform for controlling the admission and exhaust of fluid pressure to and from said motor, substantially as described.

In testimony whereof I hereto affix my signature in presence of two witnesses.

EDMUND L. PENRUDDOCKE.

Witnesses:
R. D. JOHNSTON, Jr.,
NOMIE WELSH.

---

Copies of this patent may be obtained for five cents each, by addressing the "Commissioner of Patents, Washington, D. C."